H. S. NICHOLS.
PLANT PROTECTOR.
APPLICATION FILED APR. 15, 1914.
1,125,378.
Patented Jan. 19, 1915.
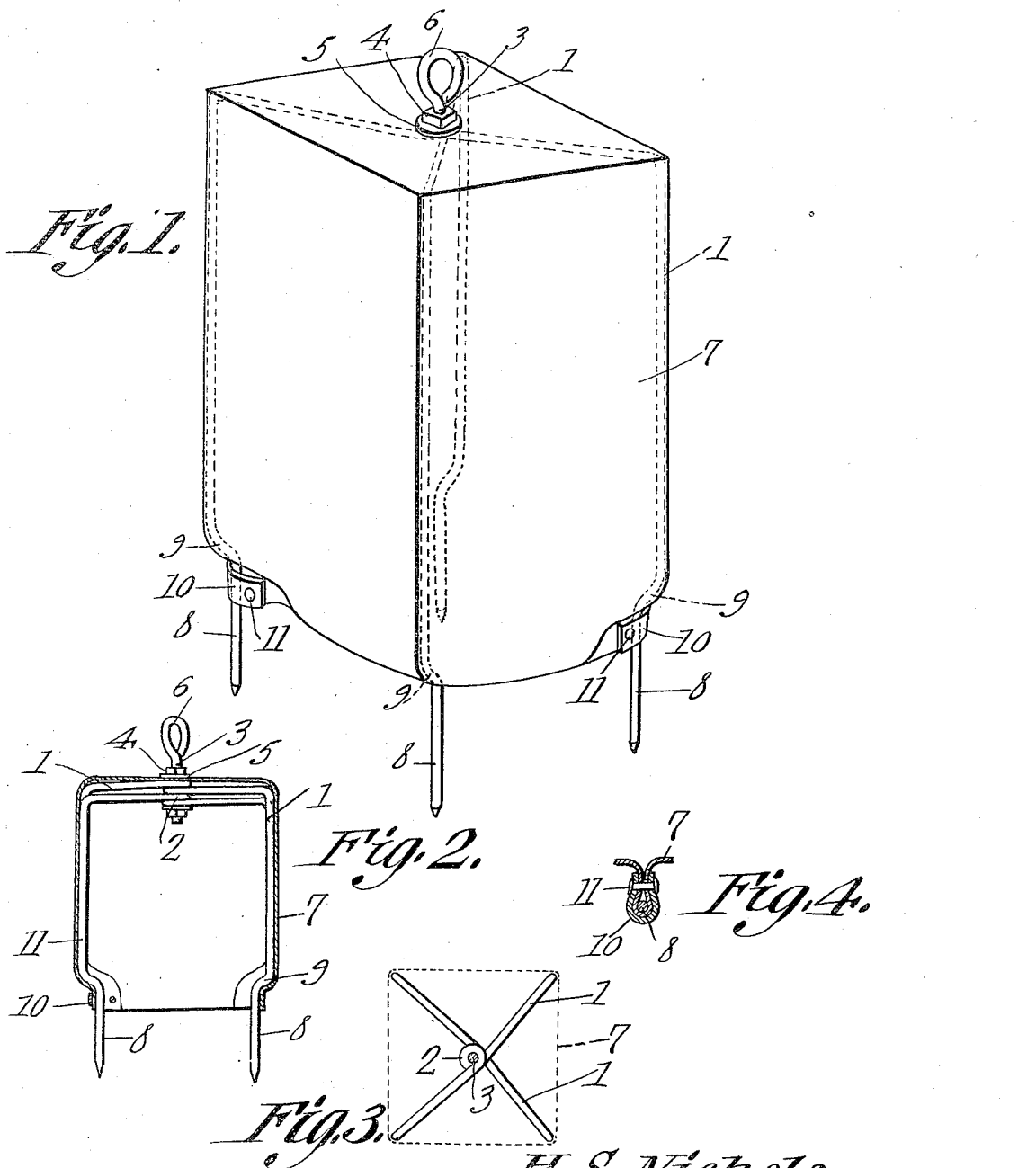
H. S. Nichols
Inventor

UNITED STATES PATENT OFFICE.

HARRISON S. NICHOLS. OF OAKES, NORTH DAKOTA.

PLANT-PROTECTOR.

1,125,378.   Specification of Letters Patent.   Patented Jan. 19, 1915.

Application filed April 15, 1914. Serial No. 832,008.

*To all whom it may concern:*

Be it known that I, HARRISON S. NICHOLS, a citizen of the United States, residing at Oakes, in the county of Dickey and State of North Dakota, have invented a new and useful Plant-Protector, of which the following is a specification.

The present invention appertains to a protector for fruit, vegetables and flowers, and aims to provide a novel and improved device of that character particularly designed for protecting young and tender plants against injury by frosts or cold weather.

The present invention contemplates the provision of a simple and inexpensive protector, which may be readily applied over and removed from the plant, and which, when not in use, may be folded or collapsed so as to be compactly stored or carried.

It is also within the scope of the present invention, to provide a protector of the nature indicated, of unique construction, whereby its utility will be enhanced, and whereby the device will be convenient, practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made without departing from the spirit of the invention.

The invention has been illustrated in its preferred embodiment in the accompanying drawing, wherein:—

Figure 1 is a perspective view of the protector in open or unfolded condition. Fig. 2 is a reduced side elevation of the device in folded or collapsed condition, the cover being shown in section. Fig. 3 is a reduced plan view of the frame in open or unfolded condition. Fig. 4 is an enlarged sectional detail taken through one of the covering fastenings.

In carrying out the present invention, there is provided a foldable or collapsible frame including a pair of arches 1, preferably formed of wire, and having their intermediate or yoke portions crossed and provided with alining eyes or loops 2, through which a bolt 3 is passed, so as to pivot the arches or frame elements 1 together. Nuts 4 are threaded upon the bolt 3 above and below the loops or eyes 2, and washers 5 are preferably interposed between the nuts 4 and the eyes or loops 2, to permit the arches 1 to swing relative to each other freely. The eyes 2 serve as bearings for the arches 1 embracing the bolt or pivot member 3, thus enabling the arches or frame elements 1 to be swung at right angles relative to each other, or against each other, as seen in Fig. 2.

For convenience in handling the protector, the upper end of the bolt 3 is formed with an eye, loop, or other finger hold or handle 6, which may be readily engaged by the fingers of the hand to handle the protector.

A covering or envelopment 7 is disposed over the arches 1, and is preferably of heavy canvas or other suitable material possessing the requisite insulating qualities for protecting the plant inclosed by the protector from the effects of frosts, high winds, or the like. The lower end of the covering 7 terminates above the lower ends of the limbs of the arches 1.

The lower end portions of the limbs of the arches, are offset inwardly, to provide the prongs or tines 8 insertible into the soil. The lower end of the covering 7 extends below the offset portions 9, and a pair of opposite corner portions of the covering 7 adjacent the lower end of the covering, are secured or anchored to the opposite prongs 8 of one arch 1, by means of leather or other clips 10 engaged over or straddling the said corner portions of the covering 7 and the prongs 8 directly under the corresponding offsets 9, rivets or other securing means 11 being engaged through the clips 10 and the adjacent portions of the covering 7 to hold the clips in place. The clips 10 being engaged to the respective prongs 8, below the offsets 9, will lock the clips against upward movement upon the limbs of the corresponding arch 1, so as to hold the lower end of the covering 7 in place, it being observed that the lower end of the covering will be contracted under the offsets 9, as is desirable.

In use, when the arches 1 are swung at right angles relative to each other, the covering or envelopment 7 will be opened, and stretched between the limbs of the arches, and when the protector has been opened or unfolded, as indicated, the same may be readily placed over a plant to be protected. The prongs 8 may then be forced into the soil surrounding the plant, to hold the protector in place, the offsets 9 serving as stops to limit the insertion of the prongs 8 into the soil. The covering 7 will thus thoroughly protect the plant against injury by frosts, high winds, or the like.

The protector may be readily removed from the plant, when desired, by withdrawing the protector, this being readily accomplished by grasping or holding the finger piece or handle 6 and lifting the protector off of the plant. The protector may then be folded or collapsed, into a flat condition, in which condition it may be compactly stored or handled.

The present protector may be constructed in various sizes and shapes and may be made either high or low, according to the circumstances. The protector may also be employed for protecting various plants, especially young and tender ones, and is particularly useful in the early spring or fall, when frosts are so injurious to young plants.

Having thus described the invention, what is claimed as new is:—

1. A plant protector embodying a frame including pivoted elements having limbs, the lower ends of the limbs being offset inwardly, a covering mounted over the frame, and securing means engaged to the lower end of the covering to secure the lower end of the covering to certain of the said limbs below the corresponding offsets.

2. A plant protector comprising arches each including a yoke and limbs the yokes of the arches being pivoted together, the lower ends of the arch limbs being offset inwardly, a covering mounted over the arches, and securing means engaged to the lower end of the covering to secure the same to the limbs of one arch below the corresponding offsets and to contract the lower end of the covering.

In testimony that I claim the foregoing as my own, I have hereto affixed my signature in the presence of two witnesses.

HARRISON S. NICHOLS.

Witnesses:
 HANS LEE,
 C. E. RONEY.

Copies of this patent may be obtained for five cents each, by addressing the "Commissioner of Patents, Washington, D. C."